2 Sheets—Sheet 1.

A. H. ALLISON,

Assignor to EAGLE MANUFACTURING CO.

Cultivator.

No. 9,085. Reissued Feb. 17, 1880.

Witnesses:

P. C. Dietrick

William M. Dodge.

Ira H. Allison Inventor

Assignor to the Eagle Manufacturing Co.

Per By Dodger & Co Attorneys.

THE NORRIS PETERS CO., PHOTO-LITHO., WASHINGTON, D. C.

A. H. ALLISON,

Assignor to EAGLE MANUFACTURING CO.

Cultivator.

No. 9,085. Reissued Feb. 17, 1880.

Witnesses:
P. C. Dietrich
William M. Dodge

Per

A. H. Allison, Inventor
Assignor to the Eagle Manufacturing Co
By Dodge & Son Attorneys.

THE NORRIS PETERS CO., PHOTO-LITHO., WASHINGTON, D. C.

UNITED STATES PATENT OFFICE.

ASA H. ALLISON, OF MILLVILLE, INDIANA, ASSIGNOR TO EAGLE MANUFACTURING COMPANY.

CULTIVATOR.

SPECIFICATION forming part of Reissued Letters Patent No. 9,085, dated February 17, 1880.

Original No. 61,649, dated January 29, 1867. Application for Reissue filed November 28, 1879.

*To all whom it may concern:*

Be it known that, ASA H. ALLISON, of Millville, in the county of Henry and State of Indiana, have invented certain new and useful Improvements in Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to improvements in the construction of machines for the cultivation of Indian corn, cotton, or other plants set in rows in the field; and it consists in the arrangement of the plows in connection with the frame by which they are adapted to work both sides of one row of corn or cotton at a time, and are completely under the control of the driver, who is seated on the carriage-frame; and it also further consists in the application of springs which exert an upward strain upon the beams, so as to relieve the operator of the labor of lifting their entire weight by hand, and facilitate the operation of the machine.

Figure 1:
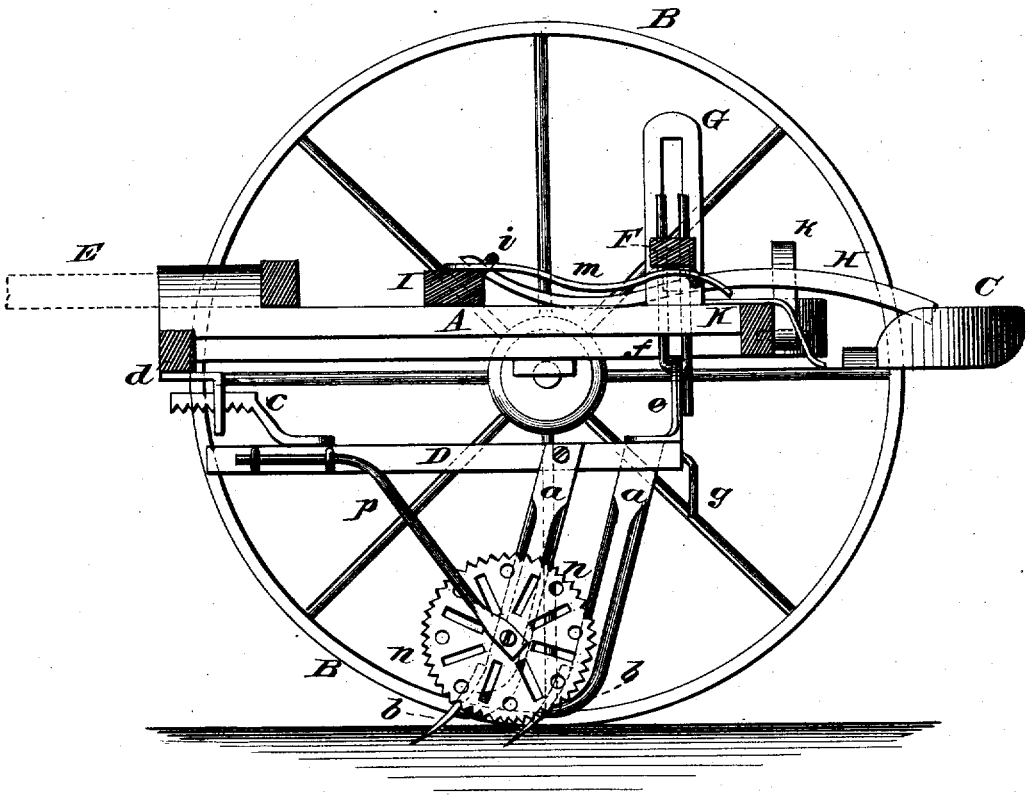
Figure 2:
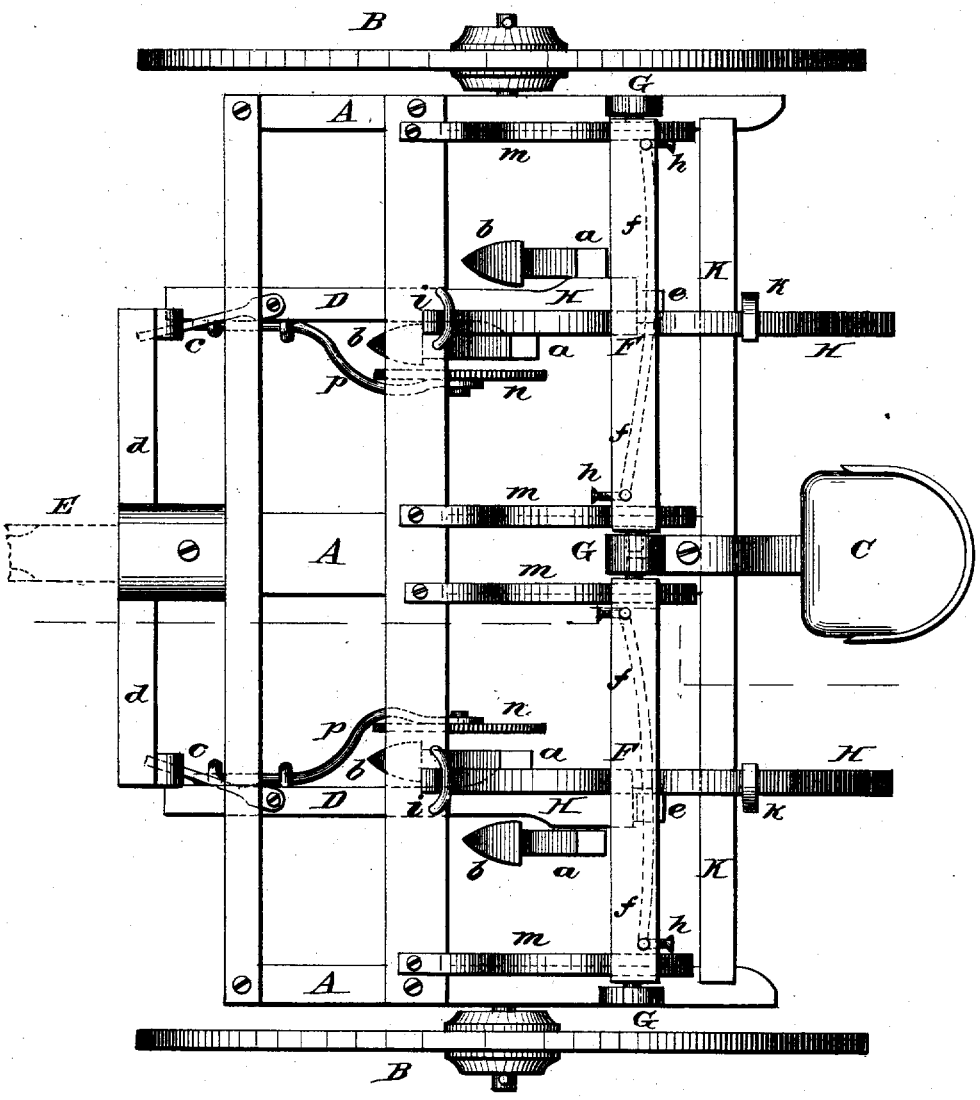

Figure 1 represents a longitudinal vertical section of the machine, showing a side view of one of the plows and its connections. Fig. 2 represents a top-plan view of the machine.

A represents the truck-frame, built of strong square timbers in a rectangular form. It is mounted on two driving-wheels, B B, in the usual way. C is the operator's seat, mounted centrally on the rear end of the frame. E is the draft-pole.

D D are the plow-beams, each provided at the rear end with two standards, *a a*, located on opposite sides, one in advance of the other, and each provided with a plow or shovel, *b*. The forward end of each beam is suspended by a clevis or hook, *c*, to the under side of a cross-bar, *d*, so that it can swing sidewise. The rear ends of the beams are hung by hooks or staples *e e* upon suspended ways or metal guide-rods *f f*, which are curved outward in conformity to the lateral sweep of the rear ends of the beams, so that the hooks *e* can slide on them from one side to the other, for the purpose of allowing the driver to move the plows nearer to or farther from the corn, as required, which is accomplished by means of stirrups or levers *g g*, fastened on the rear ends of the plow-beams.

The guide-rods *f f* are suspended from cross-heads F F, through which the ends pass vertically, and in which they are made adjustable, to suit the required depth of the plows, by the use of set-screws *h h*. The cross-heads F slide up and down in slotted uprights G G G on the main frame, and are depressed by means of levers H H, which are fastened to them centrally, and which have their fulcra at *i i* upon a cross-beam, I, of the truck A, while their free ends extend backward on opposite sides of the operator's seat in such positions that he may conveniently operate them. The levers are held down when the cross-heads F are depressed, so that the plows or shovels can enter the ground by catch-hooks *k k*, placed on the rear cross-beam, K, of the main frame or truck, and when the levers are released the cross-heads and beams D are raised by means of flat curved springs *m m*, which latter are attached at one end to the cross-beam I of the main frame, and arranged to bear at their free ends upward beneath the cross-heads F, as shown.

It will be seen that the weight of the plow-beams and their shovels is carried upon and sustained by springs, and that the plows are lifted from their operative position to their inoperative position, or position in which they are carried by the action of the springs, so that the operator, instead of being required, as usual, to exert sufficient power to lift the plows, is enabled to throw them out of action by a very slight exertion.

It will also be noticed, on reference to Fig. 1 of the drawings, that the slots in the standards G extend downward below the point at which the cross-heads are held by the levers and hooks, so as to admit of the beams and shovels being depressed still farther. This admits of the shovels having a limited vertical play in the ground while the depressing-levers are locked down, and while the weight is carried by the springs.

On the inside of each of the inside shovels, *b*, I place a clod-guard, *n*, which consists of a small wheel suspended by a rod, *p*, from the plow-beam, and made with spokes or open lattice-work of any kind to allow the finer soil to sift through as the guard travels along side the plants when at work, while the larger clods are turned aside and prevented from being thrown upon the small plants.

I am aware that a wheeled cultivator made to straddle the rows and having a driver's seat is not new, and I therefore make no claim, broadly, thereto.

I am also aware that a sulky-plow has been hitherto proposed wherein a mold-board plow of ordinary construction had its beam connected at the forward end by a loose vertically-sliding joint to a wheeled frame, and the plow connected at the rear end to an upright arm, the upper end of which passed through a nut bearing on a spring on the main frame, the spring being designed to relieve the plow from excessive downward pressure in the extraordinary event of the point of the plow being depressed so far as to give the plow a tendency to sink itself deeply into the earth. The above arrangement differs from mine in that the depth of the penetration and the vertical action are not governed wholly by the spring, since the forward end of the beam is free to rise and fall; also, in that there was no provision for allowing a lateral movement of the beams, while in my machine special provision must be and is made to permit this lateral action, and at the same time continue the lifting or sustaining action of the springs; also, in that the spring used in the sulky-plow was not designed to and did not render the operator assistance in raising the plow from the ground, and also in that, so far as appears, it did not suspend the plow with a spring action during the ordinary course of operations; but, Having described my invention, what I do claim is—

1. The plow-beams D D, suspended from the curved guide-rods *f f* and connected with the stirrups or levers *g g*, for obtaining lateral movement, in combination with the vertically-sliding cross-heads F F, levers H H, and springs *m m*, substantially as and for the purpose described.

2. The combination of a wheeled frame and vertically-swinging drag-bars jointed at their forward ends to the frame at a fixed height, and springs interposed between and having connection with both the frame and beams, and exerting an upward strain upon the latter when the machine is in action.

3. A cultivator wherein the attendant is mechanically assisted in raising the shovels from the ground, the same embracing the combination of a wheeled frame, vertically-swinging beams, and lifting-springs adapted and arranged to lift the free ends of the beams without assistance above their operative position, substantially as described.

4. The combination, in a straddle-row cultivator, of a wheeled frame, two independent vertically and laterally swinging beams, and springs adapted and arranged to exert an upward strain on the beams and permit them to move both vertically and laterally while subject to the spring action, substantially as described.

5. In a wheeled cultivator, drag-bars capable of a vertical movement at the rear ends only, in combination with springs exerting a lifting strain on said ends, whereby the springs are caused to govern or assist in governing the position of the beams and shovels, substantially as described.

6. In a wheeled cultivator, the combination of vertically-moving beams, springs acting upward thereon, and means, substantially as described, for holding the beams down, so that the springs will automatically lift the beams and shovels out of action when released, as set forth.

7. In a cultivator, the combination of a wheeled frame, vertically-swinging beams jointed thereto, and springs arranged to receive the weight of and sustain the beams when the latter are elevated out of action, substantially as described.

8. In a wheeled cultivator, the combination of beams adapted to swing vertically at the rear ends, springs exerting an upward strain on said beams, and handles under the direct control of the attendant, operating upon and enabling him to control the beams, substantially as described.

ASA H. ALLISON.

Witnesses:
JESSE HARROLD,
F. RATCLIFF.